United States Patent
Müller et al.

(10) Patent No.: US 6,858,965 B2
(45) Date of Patent: Feb. 22, 2005

(54) STATOR FOR A SYNCHRONOUS MACHINE

(75) Inventors: Jörg Müller, Bad Kissingen (DE); Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/639,251

(22) Filed: Aug. 12, 2003

(65) Prior Publication Data

US 2004/0075359 A1 Apr. 22, 2004

(30) Foreign Application Priority Data

Aug. 12, 2002 (DE) .......................................... 102 36 942

(51) Int. Cl.$^7$ ............................. H02K 1/12; H02K 1/18
(52) U.S. Cl. ...................................... 310/216; 310/218
(58) Field of Search ................................ 310/216–218, 310/254

(56) References Cited

U.S. PATENT DOCUMENTS 3,869,629 A * 3/1975 Ogawa et al. .............. 310/216
5,015,905 A * 5/1991 Koharagi et al. ........... 310/186
5,250,867 A * 10/1993 Gizaw ....................... 310/179

FOREIGN PATENT DOCUMENTS

| DE | 196 09 340 A1 | | 9/1997 | |
|----|---------------|---|--------|---|
| EP | 0 849 857 A1 | | 6/1998 | |
| JP | 2000166139 | * | 6/2000 | ................. 310/218 |
| JP | 2003102138 | * | 4/2003 | ................. 310/218 |

* cited by examiner

Primary Examiner—Tran Nguyen
(74) Attorney, Agent, or Firm—Henry M. Feiereisen

(57) ABSTRACT

Stators for harmonic motors are disclosed. The stators are easy to assemble and include a laminated armature made of sheet metal plates. The laminated armature is formed of a substantially cylindrical laminated star armature with a plurality of radially outwardly oriented pole heads distributed along the circumference of the laminated star armature, and a substantially cylindrical laminated yoke armature having radially inwardly oriented pole teeth and arranged radially outside of and concentrically with the laminated star armature. Each of the pole heads is arranged radially adjacent to a corresponding one of the pole teeth. Windings are applied to the pole teeth before the tooth head sleeve or the laminated star armature are inserted in and joined with th laminated yoke armature.

12 Claims, 3 Drawing Sheets

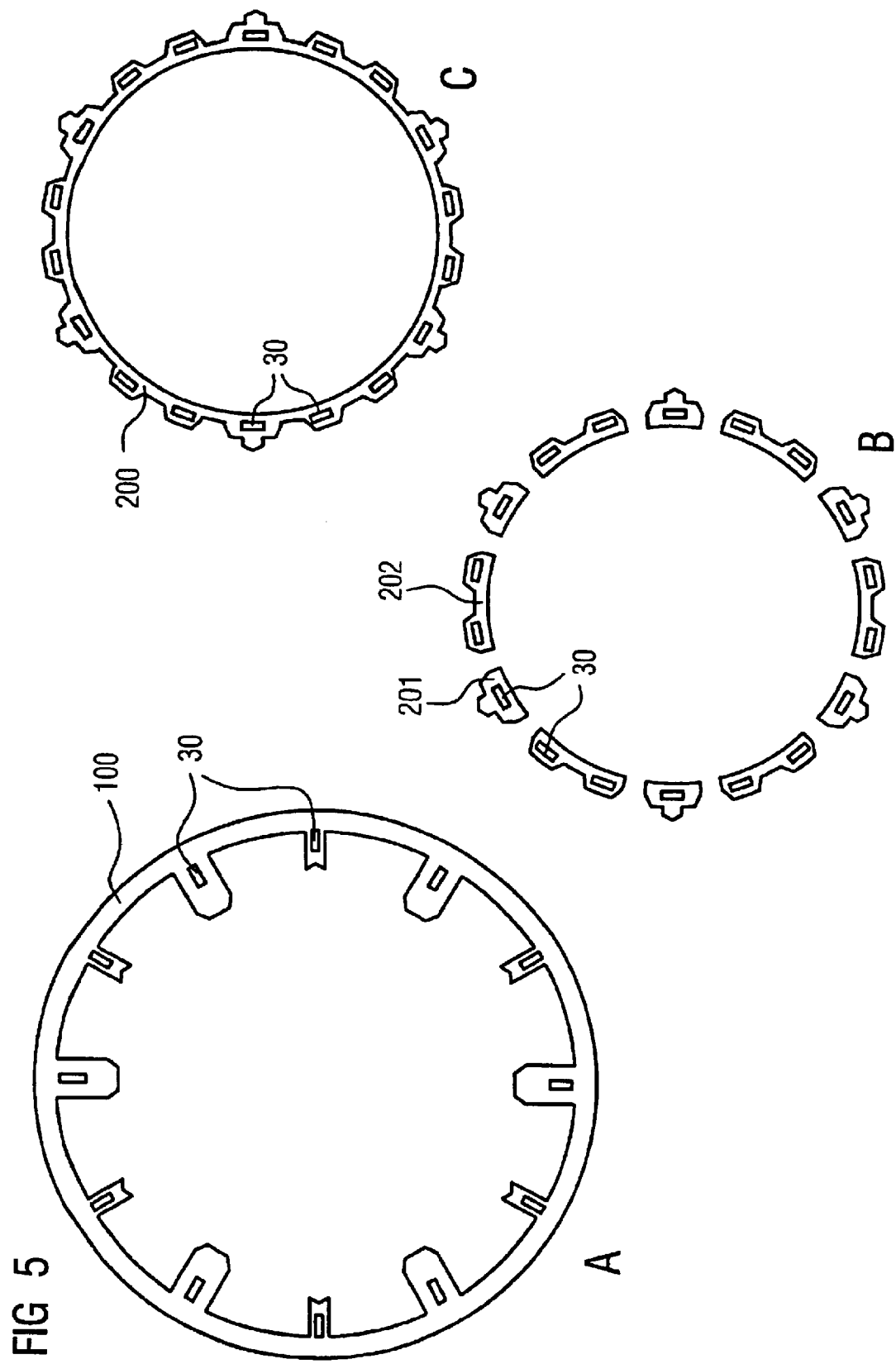

STATOR FOR A SYNCHRONOUS MACHINE

CROSS-REFERENCES TO RELATED APPLICATIONS

This application claims the priority of German Patent Application, Serial No. 102 36 942.9, filed Aug. 12, 2002, pursuant to 35 U.S.C. 119(a)–(d), the disclosure of which is incorporated herein by reference.

BACKGROUND OF THE INVENTION

The invention is directed to laminated armatures made of sheet metal plates for an electric machine, in particular to armatures for the stator of a synchronous machine, as well as to a method for producing a winding arrangement for an electric machine with such armatures.

Motors where the number of rotor poles corresponds to an integer multiple, e.g., 2, 4, 5 or 7 of the primary number of stator poles, are referred to as harmonic motors. Stators of so-called harmonic motors have to satisfy specific requirements. The stator teeth of such harmonic motors should advantageously have high and wide tooth heads, and the stator slots should have a high copper fill factor.

Laminated stator armatures with slots arranged between the tooth heads whereby the stator is manufactured by inserting the winding through the slots are known in the art. However, this technique cannot achieve a high copper fill factor.

The European Patent Application EP 0 849 857 A1 describes a laminated armature which consist of an inner star armature having wound pole coils and an outer yoke armature that is pressed over the inner star packet after the windings have been applied. The slot spaces are filled with a suitable resin. After the resin has hardened, the stator bore is turned to produce individual pole shoes, i.e. until the slots are produced. With this arrangement, however, a good fit at the joints between star armature and yoke armature can be achieved with a punching process only by making the stator yoke height uneven, which produces smaller slot areas than required.

It would therefore be desirable and advantageous to provide a laminated armature arrangement, which obviates prior art shortcomings, and which can be easily assembled and has a high slot fill factor.

SUMMARY OF THE INVENTION

According to one aspect of the invention, a laminated sheet metal armature for an electric machine, in particular for the stator of a synchronous harmonic machine, includes an essentially cylindrical laminated star armature with several pole heads distributed along its circumference, and an essentially cylindrical laminated yoke armature which is arranged concentrically with and radially outside the laminated star armature. The laminated yoke armature has radially inwardly oriented pole teeth, whereby the pole heads are arranged radially adjacent to corresponding ones of the pole teeth.

According to another aspect of the invention, a method for fabricating a winding arrangement for an electric machine, in particular for a stator of a synchronous machine, includes the steps of providing an essentially cylindrical laminated yoke armature with radially inwardly oriented pole teeth, applying windings to at least a subset of the pole teeth, providing an essentially cylindrical laminated star armature which has several pole heads distributed about an outer circumference of the laminated star armature, and concentrically placing the laminated star armature in the laminated yoke armature so that each of the pole heads is arranged radially adjacent to a respective one of the pole teeth.

The laminated armature advantageously provides not only a high slot fill factor, but also a uniform stator yoke height, since the required pass fit in the region of the tooth heads and slot surfaces can be punched out.

Advantageously, the number of pole heads can be identical to the number of pole teeth. The pole heads not only enhance the magnetic efficiency, but also provide a sufficiently large phase shift required for harmonic machines.

Advantageously, the pole heads are connected in the circumferential direction of the star armature only at every n-th plate. Although the pole heads should preferably not be connected due to magnetic considerations, a mechanical connection of this type is necessary for assembling the star armature with the pole heads in the form of a tooth head sleeve to simplify assembly. It is sufficient to connect the tooth heads with each other at most at every second plate, preferably every second to tenth plate, and most preferably every sixth plate.

The pole teeth of the laminated yoke armature can have two different widths, a narrower width and a wider width, with the widths alternating in the circumferential direction. These dimensions are particularly advantageous for harmonic motors.

The free ends of the narrow pole teeth can have a dovetail shape and matching pole heads can have a corresponding triangular, radially outwardly pointing projection. In this way, the pole heads can be formfittingly attached to the pole teeth, which provides tangential support for the laminated star armature relative to the laminated yoke armature stampings.

Likewise, the wider pole teeth can have a radially inwardly oriented projection and the matching pole heads can have a corresponding notch. This arrangement also fixes the location of the two armatures relative to each other.

Advantageously, a single plate of the yoke armature and a single plate of the star armature can be punched out of a single plate by arranging the single plate of the yoke armature with a rotation sense about a common rotation axis that is opposite to the rotation sense in the installed state. This not only saves material costs, but also reduces the time required for the punching operation.

Advantageously, the plates are combined directly during the punching operation into one or two laminated armatures, the star armature and the laminated yoke armature.

Advantageously, the aforedescribed armature can be used to form a stator with windings applied to the wider pole teeth, whereby the star armature or the tooth head sleeve is subsequently inserted into the yoke armature.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 5 shows a top view of the individual plates obtained during punching.

DETAILED DESCRIPTION OF PREFERRED EMBODIMENTS

Figure 1:
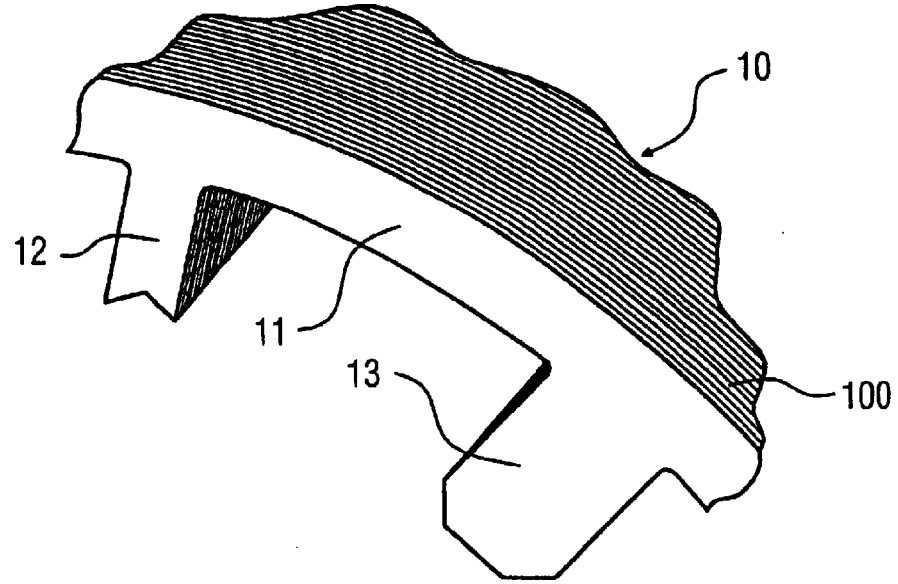
FIG. 1 shows a portion of a laminated joke armature.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a section of a laminated yoke armature for a stator of a harmonic motor. The laminated yoke armature 10 includes a plurality of consecutively arranged individual plates 100 which each have a yoke section 11 and inwardly extending narrow pole teeth 12 and wide pole teeth 13 alternatingly distributed along the circumference. The free ends of the narrow pole teeth 12 have a dovetail shape. The free ends of the wide pole teeth, on the other hand, have beveled edges.

Figure 2:
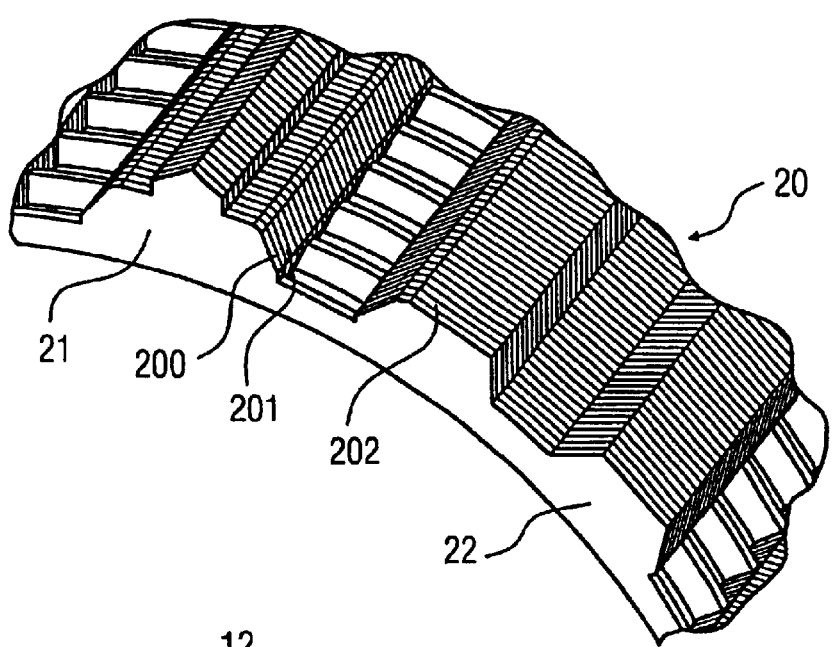
FIG. 2 shows a portion of a laminated star armature.

FIG. 2 shows a laminated star armature 20 that fittingly engages with the laminated yoke armature 10. The laminated star armature 20 can also be referred to as a tooth head sleeve or interior stator armature. A narrow tooth head 21 which extends in the longitudinal direction parallel to the rotation axis of the interior laminated stator armature 20 has an outwardly oriented triangular projection which can be form-fittingly inserted into the free end of the narrow pole tooth 12. A wide tooth head 22 which also extends outwardly from the interior laminated stator armature 20 in the longitudinal direction parallel to the rotation axis of the stator armature, has a beveled notch along its entire length which matches the bevel on the free end of the wide tooth 13.

The individual plates 200, 201, 202 of the interior laminated stator armature 20 are not all identical. Instead, only each sixth plate 200 is closed, meaning that each tooth head is connected with the tooth heads adjacent thereto. The plates 201, 202 of the tooth heads 21, 22 intermediate between the closed plates 200 are not connected with the circumferentially adjacent tooth head plates 201, 202 and are fixed in place by lamination aids 30 (see FIG. 4). This arrangement of the laminated armature with the narrow and wide tooth heads 21 and 22 in the circumferential direction produces a tooth head sleeve 20 that has sufficient rigidity in the circumferential direction.

Figure 3:
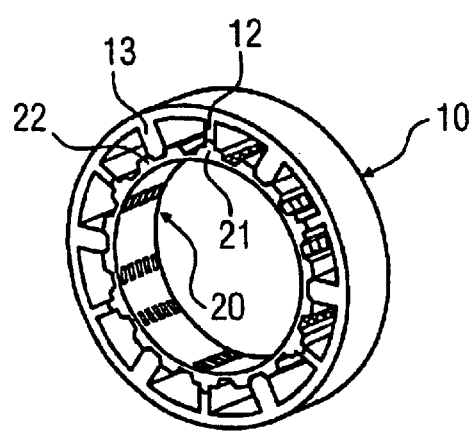
FIG. 3 shows an entire laminated armature in an installed state.

FIG. 3 depicts the entire outer laminated stator armature 10 and the entire inner laminated stator armature 20 (tooth head sleeve) in the assembled state. For sake of clarity, the windings to be placed on the wider tooth heads are not shown. However, one can easily recognize that each pole tooth 12, 13 is aligned with the corresponding tooth head 21, 22 in the radial direction.

Figure 4:
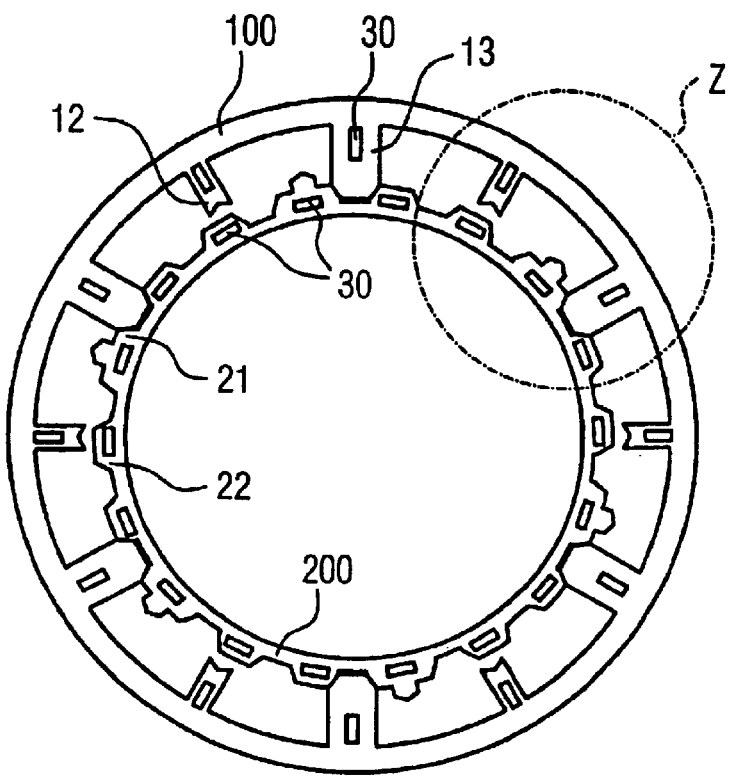
FIG. 4 shows a top view of a plate of laminated yoke armature and a plate of laminated star armature in a punched-out arrangement, as well as an enlarged section thereof.
Figure 4:
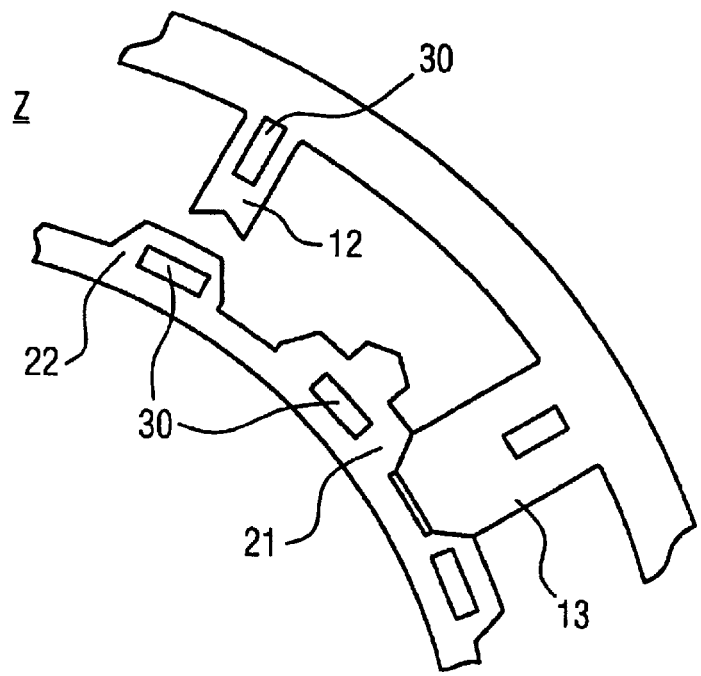

FIG. 4, on the other hand, depicts the position of an individual plate 100 of the laminated yoke armature 10 and a single plate 200 of the laminated star armature 20, as they are arranged during the punching process. The two individual plates 100 and 200 are offset relative to each other about a common rotation axis by half a pole pitch. This is more clearly shown in the enlarged detail Z of FIG. 4. The advantage of this offset is that the punched features required for a pass fit are located in the region of the slot surfaces of the corresponding other plate, so that the punching tolerances can be freely selected, without affecting the other plate at those locations which are essential for a pass fit.

In addition, FIG. 5 depicts the individual plates which are punched out for the laminated yoke armature 10 and the laminated star armature 20. As mentioned above, all metal parts are provided with lamination aids 30 that secure the metal parts in the axial direction. The individual yoke plate 100 depicted in FIG. 5A and the individual tooth head plate 200 depicted in FIG. 5C, where the adjacent teeth are connected with each other in the circumferential direction, have already been described above with reference to FIG. 4. FIG. 5B, on the other hand, shows a punched-out product where the individual tooth head plates 201 and 202 have been separated from each other. The arrangement of the tooth heads on the imaginary circumference is the same as that of the connected (closed) plate 200 in FIG. 5C. Each individual narrow tooth head plate 201 includes one lamination aid 30, and each wide tooth head individual plate 202 includes two lamination aids 30.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A laminated sheet metal armature for an electric machine, comprising:
   a substantially cylindrical laminated star armature with a plurality of radially outwardly oriented pole heads distributed along the circumference of the laminated star armature, and
   a substantially cylindrical laminated yoke armature having radially inwardly oriented pole teeth and arranged radially outside of and concentrically with the laminated star armature,
   wherein each of the pole heads is arranged radially adjacent to a corresponding one of the pole teeth;
   wherein pole teeth of the laminated yoke armature are provided with a narrower width and a wider width, and pole teeth with different widths are alternatingly arranged in the circumferential direction, and
   wherein free ends of the narrower pole teeth have a dovetail shape and pole heads adapted to match the free ends have a corresponding triangular, radially outwardly pointing projection.

2. The laminated sheet metal armature of claim 1, wherein the number of pole heads is identical to the number of pole teeth.

3. A laminated sheet metal armature for an electric machine, comprising:
   a substantially cylindrical laminated star armature with a plurality of radially outwardly oriented pole heads distributed along the circumference of the laminated star armature, and
   a substantially cylindrical laminated yoke armature having radially inwardly oriented pole teeth and arranged radially outside of and concentrically with the laminated star armature,
   wherein each of the pole heads is arranged radially adjacent to a corresponding one of the pole teeth,
   wherein the laminated star armature comprises a plurality of sheet metal plates and only every n-th plate of the laminated star armature is connected at the pole heads, wherein n is an integer number greater than 2.

4. The laminated sheet metal armature of claim 3, wherein n is an integer number between 3 and 10.

5. A laminated sheet metal armature for an electric machine, comprising:

a substantially cylindrical laminated star armature with a plurality of radially outwardly oriented pole heads distributed along the circumference of the laminated star armature, and a substantially cylindrical laminated yoke armature having radially inwardly oriented pole teeth and arranged radially outside of and concentrically with the laminated star armature, wherein each of the pole heads is arranged radially adjacent to a corresponding one of the pole teeth, wherein pole teeth of the laminated yoke armature are provided with a narrower width and a wider width, and pole teeth with different widths are alternatingly arranged in the circumferential direction, and wherein the wider pole teeth have a radially inwardly oriented projection and the pole heads adapted to match the wider pole teeth have a corresponding notch.

6. A laminated sheet metal armature for an electric machine, comprising:

a substantially cylindrical laminated star armature with a plurality of radially outwardly oriented pole heads distributed along the circumference of the laminated star armature, and a substantially cylindrical laminated yoke armature having radially inwardly oriented pole teeth and arranged radially outside of and concentrically with the laminated star armature, wherein each of the pole heads is arranged radially adjacent to a corresponding one of the pole teeth, wherein the laminated star armature and the laminated yoke armature each comprise a plurality of sheet metal plates, and wherein a single plate of the laminated yoke armature and a single plate of the star armature that is continuous in the circumferential direction, are punched out from a single metal plate, wherein the single plate of the yoke armature is punched out with a rotation sense about a common rotation axis that is opposite to the rotation sense in the installed state.

7. The laminated sheet metal armature of claim 1, and further comprising lamination aids that stabilize the laminated star armature.

8. A stator with a laminated sheet metal armature of claim 1, and further comprising stator windings disposed about the pole teeth having the wider width.

9. The laminated sheet metal armature of claim 3, and further comprising lamination aids that stabilize the laminated star armature.

10. The laminated sheet metal armature of claim 5, and further comprising lamination aids that stabilize the laminated star armature.

11. The laminated sheet metal armature of claim 6, and further comprising lamination aids that stabilize the laminated star armature.

12. A stator with a laminated sheet metal armature of claim 5, and further comprising stator windings disposed about the pole teeth having the wider width.

* * * * *